United States Patent
Ingram et al.

(10) Patent No.: US 9,043,106 B2
(45) Date of Patent: May 26, 2015

(54) VEHICLE CONTROL SYSTEM AND METHODS

(75) Inventors: Benjamin T. Ingram, Sunnyvale, CA (US); Robert Ussery, Newport Beach, CA (US); William M. Yates, III, Aliso Viejo, CA (US)

(73) Assignee: W. MORRISON CONSULTING GROUP, INC., Aliso Viejo, CA (US)

(*) Notice: Subject to any disclaimer, the term of this patent is extended or adjusted under 35 U.S.C. 154(b) by 71 days.

(21) Appl. No.: 13/538,107

(22) Filed: Jun. 29, 2012

(65) Prior Publication Data

US 2013/0261914 A1    Oct. 3, 2013

Related U.S. Application Data

(63) Continuation-in-part of application No. 12/897,534, filed on Oct. 4, 2010, now Pat. No. 8,973,690.

(60) Provisional application No. 61/618,482, filed on Mar. 30, 2012.

(51) Int. Cl.
*G06F 7/00* (2006.01)
*B64D 33/00* (2006.01)
*B64C 39/02* (2006.01)

(52) U.S. Cl.
CPC .......... *B64D 33/00* (2013.01); *B64C 2201/187* (2013.01); *B64C 39/024* (2013.01); *B64C 2201/021* (2013.01); *B64C 2201/042* (2013.01); *B64C 2201/066* (2013.01); *B64C 2201/104* (2013.01); *B64C 2201/127* (2013.01)

(58) Field of Classification Search
CPC .......... B60W 40/06; B60W 40/04; G06F 7/00; G01C 21/34; B64C 39/024; B64C 33/00
USPC .............................. 701/70, 400–478, 533, 123
See application file for complete search history.

(56) References Cited

U.S. PATENT DOCUMENTS

| | | | |
|---|---|---|---|
| 2007/0111475 A1* | 5/2007 | Licht et al. | 438/459 |
| 2007/0112475 A1* | 5/2007 | Koebler et al. | 701/1 |
| 2008/0275644 A1* | 11/2008 | Macneille et al. | 701/209 |
| 2010/0106401 A1* | 4/2010 | Naito et al. | 701/201 |
| 2010/0286909 A1* | 11/2010 | Tate et al. | 701/209 |
| 2013/0030605 A1* | 1/2013 | Basir et al. | 701/1 |

\* cited by examiner

*Primary Examiner* — Helal A Algahaim
*Assistant Examiner* — Nga X Nguyen
(74) *Attorney, Agent, or Firm* — McKenna Long & Aldridge LLP

(57) ABSTRACT

A control system that makes adjustments, such as limiting the maximum speed or maximum torque in a vehicle, is provided. These adjustments can be based on knowledge about the vehicle and trip, and on the estimated energy remaining. The control system is applicable to a wide range of vehicles, including ground, air, water, and sea vehicles, as well as vehicles powered by battery, electricity, compressed natural gas, or even liquid fuel propulsion systems. The control system may be used to adjust vehicle operation in route to assure the vehicle reaches a destination and to inform or counteract a human vehicle operator. Control system can also be used in racing applications to calculate the fastest-possible race speed and drive torque for a given race length; or alternatively, in endurance racing or delivery applications to optimize the vehicle speed and/or drive torque for a given race length or route.

10 Claims, 13 Drawing Sheets

VEHICLE CONTROL SYSTEM AND METHODS

CROSS REFERENCE TO RELATED APPLICATIONS

This application is a Continuation-in-Part of U.S. application Ser. No. 12/897,534, filed on Oct. 4, 2010, issued as U.S. Pat. No. 8,973,690, on Mar. 10, 2015, titled "FRONT WHEEL ENERGY RECOVERY SYSTEM," and also claims the benefit of U.S. Provisional Application No. 61/618,482, titled "LONG RANGE ELECTRIC AIRCRAFT AND METHOD OF OPERATING SAME," filed on Mar. 30, 2012, both of which are hereby incorporated by reference in their entirety as if fully disclosed herein.

BACKGROUND

1. Field

The present disclosure generally relates to control systems and methods. More specifically, the present disclosure relates to systems and controls for adjusting the operation of different types of vehicles.

2. Discussion of the Related Art

Vehicles, including cars, motorcycles, trains, ships, boats, aircraft, helicopters, and the like, often have one or more energy sources driving them. Typically, a vehicle stores energy in a form that allows it to be converted on demand to meet the vehicle's needs. In addition, the vehicle may extract energy from its surrounding environment, as is the case with a vehicle that is driven by a kinetic recovery system ("KERS"), electricity, batteries, compressed natural gas, solar power, liquid fuel propulsion, wind, etc.

SUMMARY

Unfortunately, the control systems of vehicles have many shortcomings. For example, control systems lack the ability to adjust vehicle operation in route to assure that the vehicles reaches its destination without running out of energy. Accordingly, a control system that makes adjustments, such as limiting the maximum speed or maximum torque in a vehicle; thus, providing "range assurance," for example, is disclosed. These adjustments can be based on knowledge about the vehicle and trip, and on the estimated energy remaining. The control system is applicable to a wide range of vehicles, including ground, air, sea, and marine vehicles, as well as vehicles powered by battery, electricity, compressed natural gas, or even liquid fuel propulsion systems.

The control system may be used to adjust vehicle operation en route to assure the vehicle reaches a destination and to inform or counteract a human vehicle operator. In addition, the control system can be used in racing applications to calculate the fastest-possible race speed and highest drive torque for a given race length, or alternatively, in endurance racing applications to optimize the race speed and drive torque for a given race length. In electric vehicle applications, particularly electric delivery vehicles, the disclosed control system can be used to plan optimal routes based on minimum energy usage.

In an illustrative embodiment, a method for ensuring a vehicle reaches its intended destination is disclosed. The method may include: (a) receiving information to determine a starting position for the vehicle and (b) receiving information relating to an intended destination for the vehicle. The method may further include (c) computing at least one route between the starting position and the intended destination considering at least one of the topographical features along said route; the actual, predicted, or historical traffic along said route; and the actual, predicted, or historical weather along said route; distance; driving speed. The method can further include (d) estimating the energy available to the vehicle, (e) determining whether the energy available to the vehicle is sufficient to propel the vehicle from the starting position to the intended destination based on the at least one computed route, and (f) generating a signal based on the results obtained in step (e).

The method may further include communicating whether the intended destination can be reached with the energy available to the vehicle based on the generated signal. In an embodiment, the method may also include computing a plurality of alternate routes between the starting position and the intended destination during step (c) and generating a signal in step (f) comprising information relating to alternate routes. The method can also include computing at least a route between the starting position and at least one alternative destination and generating the signal in step (f) comprising information relating the route to the least one alternative destination. Step (c) can include estimating the energy required to propel the vehicle to the intended destination.

The method may also include accounting at least in part for slopes in the topographical features along the route at least in part to estimate at least one of an energy discharge and an energy recovery. The signal can have information relating to a predicted energy remaining after the destination is reached. The method can further comprise expressing the information relating to the energy remaining after the destination is reached in terms of additional distance the vehicle can travel after reaching the intended destination. In some embodiments, during step (d) the method may include accounting for one or more of the energy stored on-board the vehicle, energy generated on-board the vehicle, and energy available to, but not on-board of, the vehicle. The calculation can consider at least one of recharging options along the route, battery pack swapping options along the route, and inductive recharging options along the route.

In some embodiments, step (d) can account for battery impedance and step (e) may account at least in part for driving habits of the operator of the vehicle. The method may include using the signal to modify a magnitude of at least one of acceleration and braking commands to the vehicle. The method may also include optimizing at least one of acceleration and braking to achieve at least one of maximum distance and maximum speed.

In an exemplary embodiment, a method for ensuring an aircraft reaches its intended destination is disclosed. The method may include (a) calculating a starting position for the aircraft and (b) receiving information relating to an intended destination for the aircraft. The method can further include (c) calculating a route between the starting position and the intended destination considering at least one of the elevation(s) above sea level to be flown along said route; the actual, predicted, or historical winds aloft along said route; the proximity of locations over which depleted battery packs may be dropped; and the proximity of locations from which recharged battery packs may be acquired. The method can further include (d) determining the energy available to the vehicle considering at least one of the proximity of locations over which depleted battery packs may be dropped and the proximity of locations from which recharged battery packs may be acquired. In addition, the method may include (e) determining whether the energy available to the vehicle is sufficient to propel the vehicle from the starting position to the intended destination based on the calculated route and (f) generating a signal based on the results obtained in step (e).

In an embodiment, a system for ensuring a vehicle reaches its intended destination including a vehicle controller having a destination assurance engine and at least one user device having at least one user application is disclosed. The system can further include a motor controller and at least one sensor. The destination assurance engine can have a trip model capable of dividing a trip into one or more segments and a stored energy estimator and a vehicle model. At least one user device may be capable of providing a graphical unit interface comprising at least one of layered screens, graphical gauges, and display stored energy status.

Advantages and features of the disclosure in part may become apparent in the description that follows and in part may become apparent to those having ordinary skill in the art upon examination of the following or may be learned from practice of the disclosure. The advantages and features of embodiments of the present disclosure may be realized and attained by the structures and processes described in the written description, the claims, and in the appended drawings.

It is to be understood that both the foregoing general description and the following detailed description are exemplary and explanatory and should not be construed as limiting the scope of the claims.

BRIEF DESCRIPTION OF THE DRAWINGS

The accompanying drawings are included to provide a further understanding of the disclosure, and are incorporated herein and constitute a part of this application. The drawings together with the description serve to explain exemplary embodiments of the present disclosure. Wherever possible, the same reference numbers will be used throughout the drawings to refer to the same or like parts. In the drawings.

DETAILED DESCRIPTION OF THE ILLUSTRATED EMBODIMENTS

Figure 1:
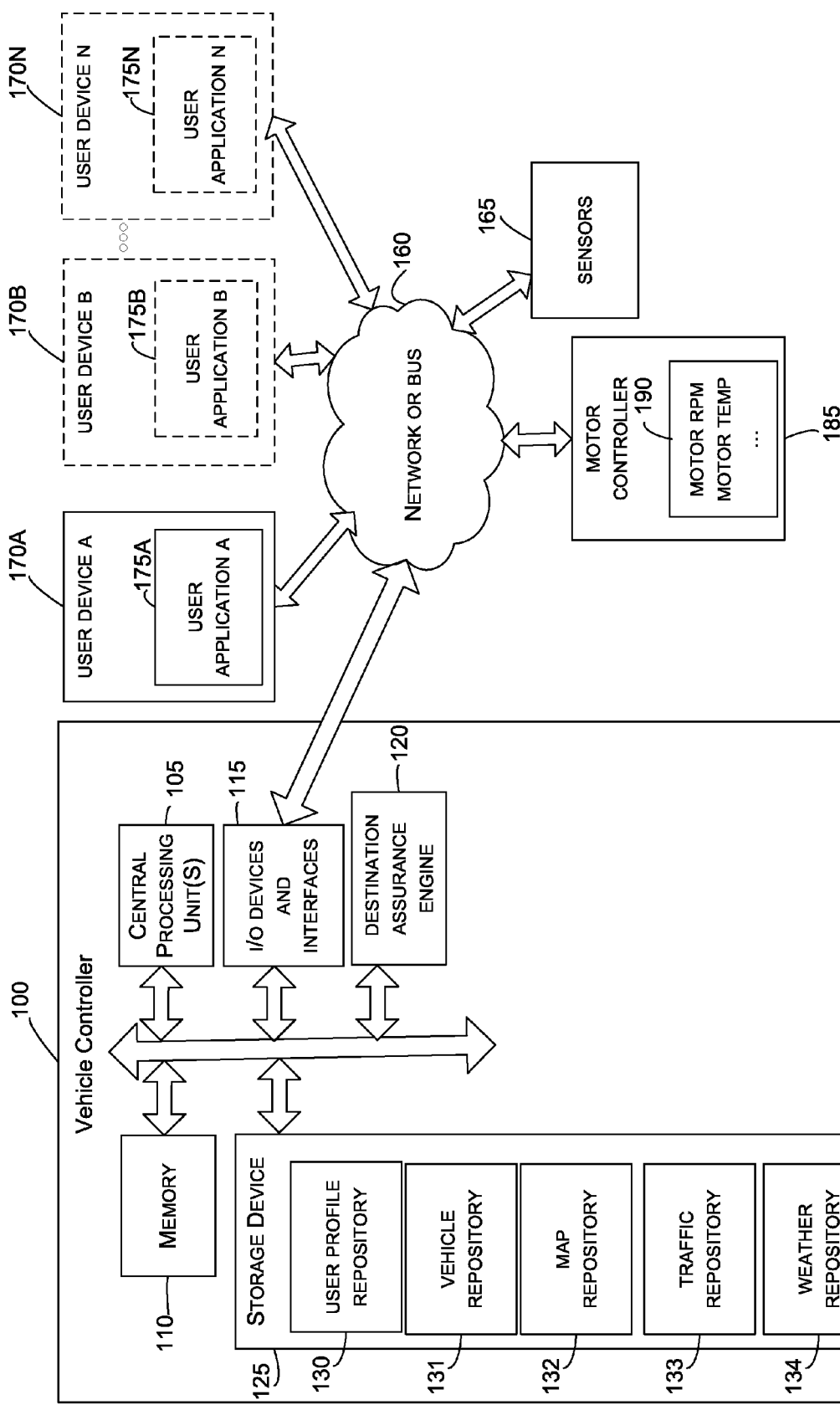
FIG. 1 illustrates an exemplary block diagram of a vehicle control system, according to an embodiment of the disclosure.

Reference will now be made in detail to the specific embodiments of the present disclosure, examples of which are illustrated in the accompanying drawings. Wherever possible, the same reference numbers will be used throughout the drawings to refer to the same or like parts.

FIG. 1A illustrates a block diagram of an exemplary vehicle control system. As shown, a vehicle controller 100 communicates with sensors 165, user devices 170A-N (representative of any number of user devices), and/or motor controller 185 over a network or bus 160. Communication within the system may take place over network 160 using sockets, ports, a user-configurable controller-area network bus 194 (CAN network bus), and other mechanisms known in the art. The communication may also be via wires, wireless technologies, cables, or other digital or analog techniques and devices to perform those techniques over a local area network (LAN), wide area network (WAN), personal area network (PAN), or the internet, for example. Of note, vehicle controller 100, sensors 165, user device 170A-N, and/or motor controller 185 may reside on physically separate machines, such as computers, or be on the same machine.

Vehicle controller 100, and other devices shown, may be a computing system, mobile device, one or more computer servers or a peer-to-peer architecture, application specific integrated circuit ("ASIC"), microcontroller, engine control unit ("ECU"), or other device that allows a user, to exchange information with sensors 165, motor controller 185, and user device 170A-N. Vehicle controller 100 can include one or more central processing units (CPUs) 105. In addition, vehicle controller 100 can also include a memory 110, such as random access memory (RAM), non-volatile flash memory, or discs, to store information temporarily or permanently. Vehicle controller 100 may further include one or more input/output (I/O) devices and interfaces 115, such as a network interface or card, keyboard, and the like to receive or transmit data, as well as a storage device 125.

Components of vehicle controller 100 can be interconnected using a standards based bus system, such as Peripheral Component Interconnect (PCI), for example. Vehicle controller 100 may include various operating systems, hardware resources, and be on different network domains. The operating systems may manage the various hardware resources and provide a graphical user interface (GUI).

Storage device 125 includes one or more data repositories having a variety of structured or unstructured content, such as file systems or databases. As shown, storage device 125 includes a user profile repository 130, vehicle repository 131, map repository 132, traffic repository 133, and weather repository 134. The user profile repository 130 can include information about one or more users, such as the types of vehicles they own, home address, work address, etc. User profile repository 130 also includes data regarding driving behaviors and habits of a user, such as how hard the particular user tends to accelerate and brake, etc. As explained in further detail below, this can advantageously allow for a continuing improvement in accuracy as the vehicle control system learns and modifies the destination assurance algorithm based on the particular habits of a particular operator.

For example, when predicting how much energy is going to be used on a route, a model of the vehicle operator with parameters such as average acceleration, average deceleration, average amount over the speed limit they drive, and lateral acceleration (g's) they tolerate in turns may be used. This model can be used to come up with a time history for how the vehicle gets to its destination (e.g., speed vs. time). The time history can be used in turn used to estimate the energy use. The model can be tuned to the driver by changing the parameters, such as the average amount they drive over the speed limit, to match what is actually observed, which will then translate into energy usage predictions that better match what the driver experiences. In a fielded system, more parameters than those above may be used, such as comfortable cabin temperature range (affects A/C power) and average absolute value of acceleration (how much the vehicle operator stops and goes). Also, the time history can include more than just speed vs. time; for example, it might include A/C setting vs. time. These variations may be a significant variable in the destination assurance equation; thus, tracking such information can be a significant advantage of the system.

Vehicle repository 131 may include specifications regarding various vehicle applications and types, such as automobiles, motorcycles, scooters, airplanes, helicopters, ships, etc. Vehicle repository 131 may also include specifications for a variety of vehicle models and manufacturers, including parts, weight, mass, aerodynamic drag, tire drag, battery capacity, fuel type, fuel efficiency (e.g., miles per gallon), length, as well as other vehicle dynamics. In some embodiments, vehicle repository 131 may also include various vehicle system and drivetrain specifications and parameters, including drivetrain torque limits, speed limits, control system gains, battery discharge curves, etc.

Map repository 132 includes position information, elevation information, and road information. For example map repository 132 stores GPS signals for the purpose of determining the vehicle's current and/or past location on earth, including latitude, longitude, altitude (which may be calculated), slope, and/or topography (e.g., about upcoming hills, stoplights, road surface, elevation, etc.), as well as time information. Map repository 132 may also include maps, which may be displayable to a user in human readable format via text or in a graphical format. The maps may include locations and/or amenities of interest, such as liquid fuel (e.g., gasoline, jet fuel, etc.) and/or compressed natural gas refueling stations, electric vehicle charging stations, and may vary depending on the application, e.g., military, aviation, marine, and/or consumer product applications.

It should be appreciated that other positioning systems may be used and such data may also be stored in the map repository 132. Other positioning systems/mechanisms used can include GLONASS (Russian), Galileo (European), cell phone tower triangulation. Of note map repository 132 may include data received via a GPS navigation device, such as a dedicated GPS navigation device made by Garmin®, a GPS module or logger, or GPS converged device, such as a smartphone or GPS-enabled camera. The information stored in map repository 132 may be received in real time and also include past GPS locations.

Traffic repository 133 can include information on traffic conditions (historical or real time data), such as vehicle speed along particular roads and highways, traffic incidents, road closures, etc. Weather repository 134 may include the temperature, humidity, precipitation, precipitation density, snowfall, wind speed and direction. Weather repository 134 may also include other environmental conditions that may affect navigation of a vehicle on the road, sea, and/or air depending on the application. For a ship application weather repository 134 may include, current, tides, and/or wind. In an aircraft application, weather repository 134 may include historical winds aloft, head winds, tail winds, cross winds, static wind conditions, etc.

Traffic repository 133 and weather repository 134 may also include data received via a web service, third party API or provider, and/or other source, such as Google Maps®, Google Earth®, Google Traffic®, Navteq Maps and Traffic®, Navteq Traffic.com®, XM Satellite Weather®, FAA, NOAA, etc., as understood in the art.

As shown, vehicle controller 100 and other devices shown, such as user devices 170A-N and motor controller 185, may include one or more engines, applications, components, or blocks. In general, the word engine (used interchangeably with the word application, module, and/or block), as used herein, refers to logic embodied in hardware and/or software instructions or an computing device, ASIC, microcontroller, and/or ECU, which can be written in a programming language, such as Verilog, Mathworks Simulink®, VHDL, C/C++, Fortran, Java®, PHP, Perl, PHP, HTML, CSS, and/or JavaScript, for example. A software engine or application can be compiled into executable programs or written in interpreted programming languages. Software engines or applications may be callable from other engines or themselves. Generally, the engines or applications described herein refer to logical modules that may be merged with other engines or applications or divided into sub-modules despite their physical organization. The engines or applications can be stored in any type of computer readable medium or computer storage device and be executed by one or more general purpose computers, processors, and/or devices described herein. In addition, the methods and processes disclosed herein can alternatively be embodied in one or more engines, applications, or specialized computer hardware.

Vehicle controller 100 may include a destination assurance engine 120 that, when executed, allows the user, such as a vehicle operator, to adjust vehicle operation in route to assure the operator that the vehicle will reach its destination without running out of energy. The adjustments, may include, for example, limiting the maximum speed or maximum torque in a ground vehicle application and can be made based on knowledge about the vehicle and trip, and on the estimated energy remaining onboard the vehicle. Destination assurance engine 120 allows the user to control operation of a wide range of vehicles, including ground, water, and air vehicles, and vehicles powered by battery electric, compressed natural gas, or even liquid fuel propulsion systems. Of note, destination assurance engine 120 also allows for destination assurance for an entire trip that includes a plurality of destinations or stops along a particular route before refueling or recharging, in other words, a "destination beyond."

Destination assurance engine 120 may provide an interface or backend to user application 175A-N that runs on user device 170A-N. Destination assurance engine 120 may also include an inbound and/or outbound application programming interface ("API") for other systems, electronic devices, and/or networks that may be onboard a vehicle to send and receive information. For example, messages may be sent by destination assurance engine 120 to motor controller 185 via network or bus 160 that allow full or partial control based on information received from sensors 165. Vehicle operation may be controlled, based on sensor data messages including the motor temperature, revolutions per minute ("RPM") of the motor, throttle level, as well as operation of other systems, such as a KERS system, power consumption from a battery, etc.

User device 170A-N (representative of any number of user devices), may include user application 175A-N (representative of any number of user applications). Each user device 170A-N may be a computing system, such as one or more computer servers or a peer-to-peer architecture, mobile device, ASIC, microcontroller, ECU, or other device that allows a user to exchange information with the vehicle controller 100 and other devices shown. User device 170A-N can include one or more CPUs, a memory, such as random RAM, to store information temporarily or permanently, one or more I/O devices and interfaces, such as a network interface or card, keyboard, and the like to receive or transmit data. User device 170A-N may further comprise a storage device, such as one or more hard drives. The storage device includes one or more data repositories having a variety of structured or unstructured content, such as file systems or databases. Components of user device 170A-N can be interconnected using a standards based bus system, such as Peripheral Component Interconnect (PCI), for example. The user device 170A-N may include various operating systems, hardware resources, and be on different network domains. The operating systems may manage the various hardware resources and provide a GUI.

User application 175A-N may be an application running in a web browser, a mobile device application, such as for an Apple iPhone®, Google Android®, for example. When executed, user application 175A-N allows a user, such as a vehicle operator or driver, to use the vehicle control system, and in particular, destination assurance engine 120. User application 175A-N may provide a GUI with an initial menu, that allows a user to selects their user name from a list of potential vehicle operators. Based on the selection, user application 175A-N may then communicate with destination assurance engine 120 which, in turn, extracts a profile for the selected vehicle operator from user profile repository 130. Destination assurance engine 120 may then monitor and characterize the driving behaviors of the operator, such as how hard the particular user tends to accelerate and brake, as compared to the default settings in the algorithm, and store these behaviors in the user's profile in user profile repository 130.

User application 175A-N also provides for implementation of a destination beyond. This may occur when it is not permissible for the vehicle to consume the entirety of the stored energy to get to destination A; in other words, user application 175A-N also factors in that the user needs to also visit destinations B, C, and D on the trip before refueling. In an exemplary embodiment, the user may manually enter a second destination, or a number of miles that must remain after the present destination is reached via user application 175A-N. For example, the user may then program in that the current destination must be reached and/or that there must be 25 miles remaining of charge after the second destination. Alternately, the user may enter a daily plan which can be a series of waypoints for an entire trip. User application 175A-N may receive this information via a wireless device, by Bluetooth®, over the internet such as from Google Maps®, etc.

In an exemplary embodiment, the GUI provided by user application 175A-N may also show the user how much energy will remain after destination A is reached, and/or show a map of the area, which may include radius circles drawn in green, yellow, and/or red in rings around the vehicle and around the destination. By looking at this, a user can see at a glance, even without having a specific destination plotted in the navigation system, about how far they can drive. The rings can be concentric and/or circular. Where a plotted map represents a hilly geography, the rings may be more densely drawn around the vehicle.

User application 175A-N may allow for several other modes of operation for the user. These modes may include a full control mode that provides destination assurance and overrides input from the vehicle operator to control the vehicle, as well as an information only mode. Full control mode may include the destination beyond feature described herein, a maximum power feature that provides for maximum power while still providing destination assurance, and/or a maximum efficiency feature that provides for maximum fuel efficiency. The information only mode may provide a demonstration by informing the vehicle operator as to whether a destination is reachable, but does not intercept or modify control signals from the vehicle operator that may be for acceleration and braking of the vehicle.

The GUI provided by user application 175A-N may include number of layered screens and graphical gauges, that display battery, gas, fuel, and/or stored energy statuses to keep the vehicle operator apprised of the vehicle systems. For example, the GUI may calculate and display the battery status (how much energy remains), battery pack temperature, battery cell health, and/or battery impedance. User application 175A-N may also calculate and display a vehicle performance model which shows all factors that affect the vehicle including dynamic vehicle performance display parameters.

The dynamic vehicle performance display parameters can comprise an image of the vehicle with real-time boxes pointing to each area of the vehicle that has an impact on the energy required to move it. For example, a car may be pictured on the display along with a box that points to the tires to signify rolling resistance and a real-time measure of the rolling resistance. Dynamic vehicle performance display parameters may also be provided for the drive train, KERS system, acceleration, slope, topography (e.g., about upcoming hills, stoplights, road surface, elevation, etc.) that the vehicle is currently on, etc. Thus, user application 175A-N can advantageously allow the user to see where energy is being consumed and how their driving behaviors impact the dynamic vehicle model and/or improve efficiency through better driving habits, proper tire inflation, etc.

User application 175A-N may also calculate and display a trip planner that allows upcoming zoom windows of features such as hills, the budgeted energy for that particular hill, versus what the vehicle actually consumed going up or down a hill. The trip planner may also provide and display weather, traffic, and GPS information as explained in connection with vehicle controller 100. User application 175A-N may also feature a number of vehicle operator input menus to allow customization of the software. Thus, user application 175A-N may receive any the following information from the user or other sources described herein: speed assumptions by road type; weather inputs, e.g., XM® weather, defaults, or operator override inputs; traffic inputs, e.g., XM® traffic, Google®, Traffic.com®, defaults, or operator override inputs; and/or charge locations and in-route charging plans not otherwise known to user application 175A-N and vehicle controller 100.

User application 175A-N can provide a contingency feature that calculates and/or displays/outlines a number of options available to the driver to ensure a destination is reached. For example, the color red may indicate that the user application 175A-N has determined that the destination will not be reached, the color yellow may indicate that if the operator improves their driving behavior the destination may be reached, and the color green can indicate that the operator will reach the destination with certainty. For example, if the contingency feature calculates that the driver is extremely close to not reaching the destination or certainly will not reach it, it may calculate and present the user with nearby options for the user to select. The options presented may include charging stations, hot swap stations, alternate routes, alternate destinations (e.g., closer restaurants of the same type as what was originally inputted as the destination by the user), and/or alternate driving habits (e.g., a crawl speed calculation that could be used to creep to the actual destination).

Motor controller 185 controls and monitors the operation of the vehicle, whether it is electric, liquid fuel, etc. In an embodiment, motor controller 185 may be an ECU. The motor controller 185 may also detect and control the electrical current that is provided to an electrical accumulator, such as a battery, and thus prevent damage to the electrical accumulator due to overcharging during regenerative deceleration of the vehicle. Motor controller 185 may adjust the generation of torque based on the speed of the vehicle and/or power an electric motor to generate the required torque using the energy from an electrical accumulator. During this operation, therefore, the energy stored in the electrical accumulator may decrease.

Sensors 165 collect and provide information, such as motor speed, motor current, motor RPM, motor temperature, speed of the vehicle, acceleration of the vehicle, electrical accumulator voltage, battery pack temperature, battery pack voltage, remaining length of the trip, lean angle (e.g., for a motorcycle). In addition, sensors 165 may also detect the following information: KERS brake lever position, brake fluid pressure, throttle position, wind direction and speed, outside temperature, humidity, ramp/slope profile, maximum allowable motor RPM, maximum allowable motor torque, and other such information. Sensors 165 may be located on the vehicle and/or input by the vehicle operator. Based on sensors 165, the vehicle controller 100, user device 170A-N, and/or motor controller 185, may control the vehicle.

Figure 2:
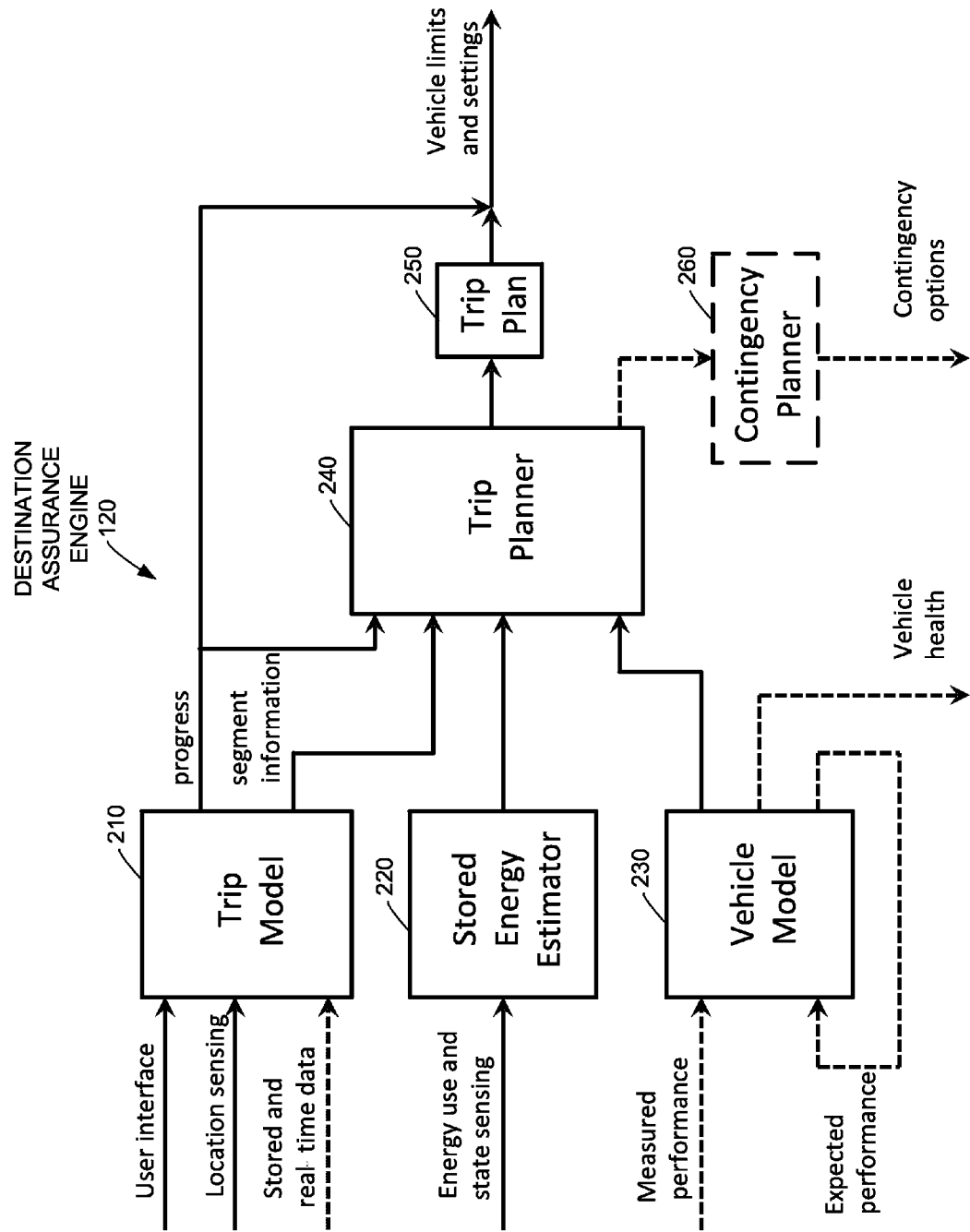
FIG. 2 illustrates actions and routines performed exemplary components of the destination assurance engine in FIG. 1, according to an embodiment of the disclosure.

FIG. 2 illustrates actions and routines performed by exemplary components of the destination assurance engine 120 of FIG. 1. In some embodiments, the illustrated routines and actions can be performed by other components of vehicle controller 100, user devices 170A-N, motor controller 185, and/or sensors 165. Depending on the embodiment, the method of FIG. 2 may include fewer or additional blocks and blocks may be performed in an order that may be different than illustrated.

As shown, trip model 210 can divide a trip into one or more segments. Trip model 210 may supply the segment information about these segments to trip planner 240, and track which segment and where within the segment a vehicle is currently. For example, in a ground vehicle application, trip model 210 may provide the following segment information that affects energy consumption to the trip planner 240: distance, expected speed, start and end elevation, expected road roughness, expected environmental conditions, including wind, air or precipitation density, temperature, etc.

In an embodiment, trip model 210 can be pre-programmed. Alternatively, in commercial applications, for example, many elements of the model can be supplied by an onboard navigation system, such as a dedicated GPS navigation device made by Garmin® that provides easy-to-use operator interfaces. The trip model 210 can leverage additional information from stored sources, such as elevation maps, street type databases, or in the aircraft application, historical winds aloft, head winds, tail winds, cross winds, static wind conditions, etc. Trip model 210 can also leverage additional real-time information, such as from traffic, weather, or road work resources, or in the aircraft application, winds aloft, turbulence, and severe weather reports. The foregoing information or data may be stored or provided in real-time by user profile repository 130, vehicle repository 131, map repository 132, traffic repository 133, weather repository 134; be provided by the third party APIs, web services; and/or be provided by sensors 165 and motor controller 185. Of note, such information is not required and when such information is not available, the trip model 210 may simply pass nominal defaults for those variables to trip planner 240.

Trip model 210 also tracks where in the trip the vehicle is, in other words, its progress. The trip model 210 may use a combination of current speed measurements and GPS data that is robust to GPS dropouts, like those caused in cities with high buildings or by large roll angles in motorcycles or airplanes. A trip distance variable may also be maintained by trip model 210 that stores how much of the trip has been completed.

In an embodiment, trip model 210 may compute trip distance by integrating the measured ground speed (e.g., measured by wheel or engine speed), which is not sensitive to GPS dropouts. Further, if the GPS is working correctly, the trip distance may be corrected at a rate proportional to the difference between the measured GPS position and the GPS position that was expected to be measured based on the current trip distance estimate. Having a plurality of rate and value sensors can advantageously provide more accurate modeling of trip progress. Of note, if trip model 210 determines that the vehicle is no longer following the planned trip or deviating from it, it can create a new trip model with an updated route from the current location of the vehicle to the original destination and automatically update user application 175A-N, or vice versa.

Stored energy estimator 220 can track the energy level of the onboard systems of the vehicle accurately, such as battery energy, compressed natural gas, liquid fuel, etc. Rate and value sensors may be used by stored energy estimator 220. For example, in an electric application, the rate sensor may be battery current and the value sensor can be battery voltage. In a liquid fuel application, the rate sensor may be fuel injector open time and fuel injector pressure differential, and the value sensor may be the tank level. Having two or more sensors may advantageously allow stored energy estimator 220 to be robust to issues that may arise with a single sensor (e.g., sensed voltage noise, fuel level slosh). In particular, the rate sensor can provide excellent short-term information, while the value sensor may provide long-term information. Thus, store energy estimator 220 can provide accurate estimates of both short- and long-term changes in energy remaining in real-time and serves as a total energy estimator and tracker for all systems. Stored energy estimator 220 may use inputs from a KERS system as well as dynamic impedance estimation inputs of a battery.

Vehicle model 230 can predict the energy usage throughout the trip based on vehicle physics, vehicle settings and limits, and/or segment information from trip model 210. For example, in an electric vehicle application, such as for an electric motorcycle, vehicle model 230 may model the energy usage of the electric vehicle as follows:

Energy required to accelerate the mass of the vehicle, the rotating components of the vehicle, and the mass of the rider and cargo: $E_{drive} = \frac{1}{2}mv_G^2 + \frac{1}{2}I\omega^2$ Energy required to overcome aerodynamic drag: $E_{drive} = \frac{1}{2}\rho v_A^2 A_D d$ Energy required to overcome rolling resistance: $E_{drive} = mgdC_R$, where $C_R = C_R(\text{road type})$ Energy required to change elevation: $E_{drive}=mgh$ Motor controller efficiency from motor manufacturer: $E_{mech}=\eta_{controller}*E_{elec}$, $\eta_{controller}=\eta_{controller}$(torque, RPM, battery voltage)

Drivetrain efficiency: $E_{drive}=\eta_{drivetrain}*E_{mech}$, $\eta_{drivetrain}=\eta_{drivetrain}$(RPM, torque)

Accessory power requirements: $E_{elec}=E_{drive}+P_{acc}t$, $P_{acc}=P_{acc}(T)$ Motor torque, power, and speed limits from motor manufacturer Battery charge and discharge power limits from battery manufacturer or electro-chemical model Battery discharge/charge curves, including impedance vs. state of charge from battery manufacturer or testing Drivetrain torque, power, and speed limits (e.g. maximum KERS torque)

In the foregoing electrical vehicle model, the following abbreviations are used:

m=mass of vehicle including rider and cargo [kg]
$v_G$=ground speed [m/s]
I=effective inertia of rotating components referenced to wheel speed, which is a function of current gear ratio [kg*m²]
ω=wheel speed [rad/s]
ρ=combined air and precipitation density [kg/m³]
$v_A$=air speed [m/s]
$A_D$=drag area [m²]
d=distance traveled along road [m]
g=acceleration of gravity [m/s²]
$C_R$=rolling resistance coefficient [non-dimensional]
h=elevation change [m]
$E_{drive}$=mechanical energy at drive wheel [J]
$E_{mech}$=mechanical energy at motor output [J]
$E_{elec}$ electrical energy at input to motor controller [J]
$\eta_{controller}$=motor controller efficiency, a function of motor torque and RPM and battery voltage [non-dimensional]
$\eta_{drive}$=drivetrain efficiency, a function of motor torque and RPM [non-dimensional]
$P_{acc}$ accessory power (e.g. air conditioning, computer and contactor power, etc.) (W)
t=time [s]
T=outside air temperature [K]

In an airplane application, the $E_{drive}$ equations may be replaced by aircraft performance equations. Thus, the aircraft may be modeled by vehicle model 230 as $E_{drive}=\frac{1}{2}\rho v_A^2 AC_D d$, where:

$$C_D=C_{D0}+C_L^2/(pi*e*AR) \text{ and } C_L=W/\frac{1}{2}\rho v_A^2 A, \text{ where:}$$

A=reference area [m²]
$C_D$=total drag coefficient [non-dimensional]
$C_{D0}$=profile and parasite drag coefficient [non-dimensional]
$C_L$=lift coefficient [non-dimensional]
e=span efficiency factor [non-dimensional]
AR=wing aspect ratio (wingspan/mean chord) [non-dimensional]

In an exemplary boat or ship application, the vehicle may be modeled by vehicle model 230 as follows:

$$\text{Drag: } D=\frac{1}{2}\rho Av^2 Cd (\rho\text{—density, } A\text{—submerged area,} v\text{—velocity, } Cd\text{—coefficient of drag)}$$

In addition, the hydrodynamic resistance of the boat or ship may factor in total resistance, residual resistance, skin friction resistance, form effect on skin friction, friction resistance, pressure resistance, wave resistance, viscous pressure resistance, wave making resistance, wave breaking resistance, viscous resistance, including the following:

Reynolds Number
Froude Number
Transmission Efficiency
Hull Efficiency
Rotational Efficiency The vehicle model 230 for the boat or ship application may also use the following parameters and equations to model the vehicle:

L=the length on the waterline i.e. LWL measured in feet
LOA=the overall length of the hull excluding extensions such as a bow-sprit
B=the maximum beam on the waterline measured in feet
T=the draft (T is used so it does not conflict with D the depth, an international definition) measured in feet from the keel to the load waterline
D=depth measured in feet
Vol=the volume of displacement in measured in cubic feet
Displ=the weight of displacement which is the Vol corrected to weight
FW=fresh water
SW=salt water
Cb=the block coefficient which is one of several coefficients of fineness and=Vol/(L*B*T)
Cm=the midship area ratio, another fineness coefficient which is Midship Area/(B*T). Although called the midship area ratio the area should be taken as the greatest area which usually occurs at the widest beam.
Cw=the waterplane area coefficient defined as Waterline Area/(L*B)
ABT=a coefficient used only in the Holtrop-Mennen formula, the area of the bulbous bow in sectional view at the forward end of the waterline measured in square feet.
Density=the weight and volume relationship of the water in which the vessel floats. For a small craft, weights are usually all in pounds and ships are usually in long tons. Values are given in long tons rather than pounds. 35 cubic feet of SW (35.96 for FW) weigh one long ton. Small boats typically use 1 cubic foot of SW weighs 64 lb, for FW use 62.4 lb.

Taylor's formula for SW: $WSA=C*(L*Displ)^{0.5}$ for SW.

Taylor's formula revised for SW and FW: $WSA=C/5.916*(L*Vol)^{0.5}$

Baier-Bragg formula: $WSA=C*L^2/10$
Baier-Bragg coeff: $C=-0.906385E-5*x^2+0.954632E-2*x+0.776457$
Froude formula: $WSA=Vol^{2/3}*(3.4+L/(2*Vol^{1/3}))$
Haslar formula: $WSA=Vol^{2/3}*(3.3+L/(2.09*Vol^{1/3}))$
Denny-Mumford formula: $WSA=L*(1.7*T+B*Cb)$
Denny-Mumford formula revised: $WSA=1.7*L*T+Vol/T$
Holtrop and Mennen published limits for powering are:

$$0.55<=Cp<=0.85$$

$$0.90<=L/B<=14.9$$

$$2.10<=B/T<=4.00$$

Holtrop-Mennen formula: $WSA=L*(B+2*T)*Cm^{0.5}*(0.453+0.4425*Cb-0.2862*Cm+0.003467*B/T+0.3696*Cw)+19.65*ABT/Cb$, where $19.65*ABT/Cb$ is the bulbous bow wetted surface and it may be added to the WSA for any other formula.

Based on the foregoing models, vehicle model 230 can be used to simulate the state of the energy stored throughout the trip with a given set of vehicle settings and limits. Trip planner 240 may then adjust the limits to ensure the energy store is not exhausted during the trip or automatically refine the vehicle model 230 based on driver behavior and real-world energy usage, for example, from the information stored in repositories 130-134 of FIG. 1. The vehicle model 230 can also be enhanced significantly by allowing refinement of its parameters during operation based on differences between measured and expected performance. For example, the vehicle model 230 can update the vehicle mass, m, to account for extra cargo in a delivery vehicle application based on differences between the expected power required to accelerate and the actual power required to accelerate. The drag area can be updated to account for modeling errors or icing in an aircraft model, or for rider shape in a motorcycle model. The battery cell impedances can be estimated based on differences between the measured and expected cell voltages at different current draws to better estimate battery heating losses and to detect failing cells.

Trip planner 240 can maintain a trip plan 250 of vehicles settings and limits throughout the remainder of a trip that can ensure that the operator arrives at his or her destination. Trip plan 250 includes vehicle limits and settings for the remaining segments of the trip. At the start of a trip, trip plan 250 may be populated with default values. During the trip, the trip plan 250 can be continually re-planned by trip planner 240 based on updates to the trip model 210, the vehicle model 230, and the stored energy estimator 220. Each cycle, the trip planner 240 may first read updated segment information from trip model 210. For example, the updated segment information may be updates to expected speeds based on changes in traffic. Trip planner 240 may then read the current estimate of energy remaining from the stored energy estimator 220, which may be used to initialize the vehicle model 230. Trip planner 240 may then run the vehicle model 230 with the current segment information to compute the energy remaining when the vehicle reaches its destination.

Of note, vehicle model 230 can use its most up to date parameter estimates, such as for vehicle weight. If there is adequate energy remaining at the destination, the trip planner 240 process may end; thus, successful completion of the trip is expected. If not, the trip planner 240 can adjust vehicle settings and limits via trip plan 250. This may occur, for example, by lowering the maximum allowed speed during the remaining highway segments, and rerunning of the vehicle model 230 by trip planner 240. If the limits cannot be adjusted, for example, because limiting speed more would be dangerous and/or completing the trip cannot be assured, the illustrated contingency planner 260 may be run. Contingency planner 260 may present alternate destinations that are assured to the vehicle operator, such as charging stations.

Figure 3:
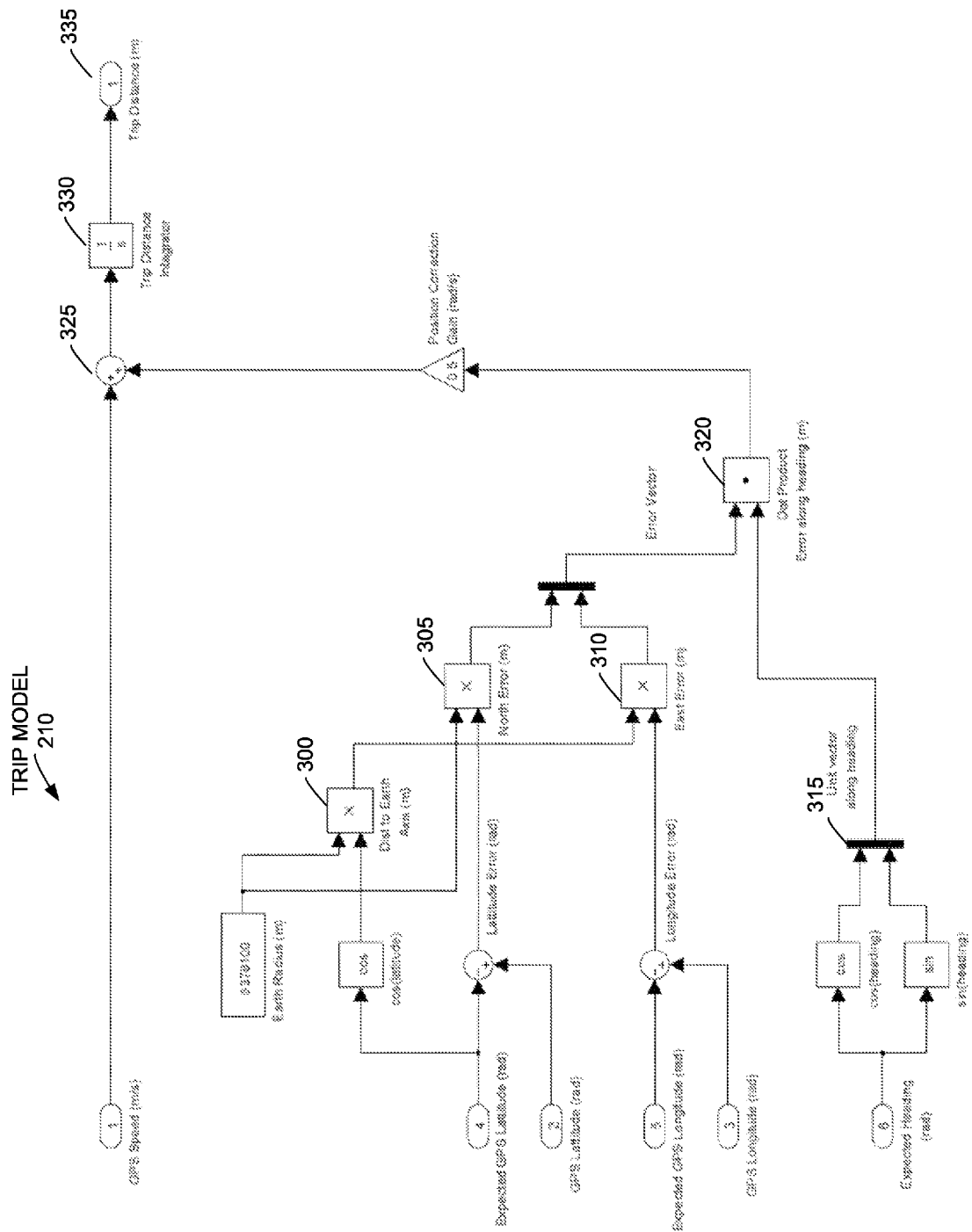
FIG. 3 illustrates a trip model routine performed by exemplary components of the vehicle controller, according to an embodiment of the disclosure.

FIG. 3 illustrates an exemplary computation of progress along a trip in the trip model routine performed by exemplary components of the vehicle controller in FIG. 1, such as destination assurance engine 120. In some embodiments, the illustrated routines and actions can be performed by other components of vehicle controller 100, user devices 170A-N, motor controller 185, and/or sensors 165. Depending on the embodiment, the method of FIG. 3 may include fewer or additional blocks and blocks may be performed in an order that may be different than illustrated.

In the illustrated embodiment, trip model 210 estimates trip distance (progress) by integrating speed (e.g. GPS speed). Note that GPS speed could be replaced by wheel speed to make the system more robust to GPS outages. Due to imperfect measurements, this estimate will drift from the true trip distance over time, so the system continually corrects the estimate based on measured positions (e.g. from GPS). Specifically, it computes the latitude and longitude error between the measured position and the expected position (expected based on the current trip distance). The latitude and longitude errors are transformed to Cartesian north/south coordinates (blocks 305 and 310) using the geometry of Earth (e.g. block 300). The component of the position error along the route is computed using the expected heading (blocks 315 and 32), which in turn is used to continually correct the trip distance estimate.

Figure 4:
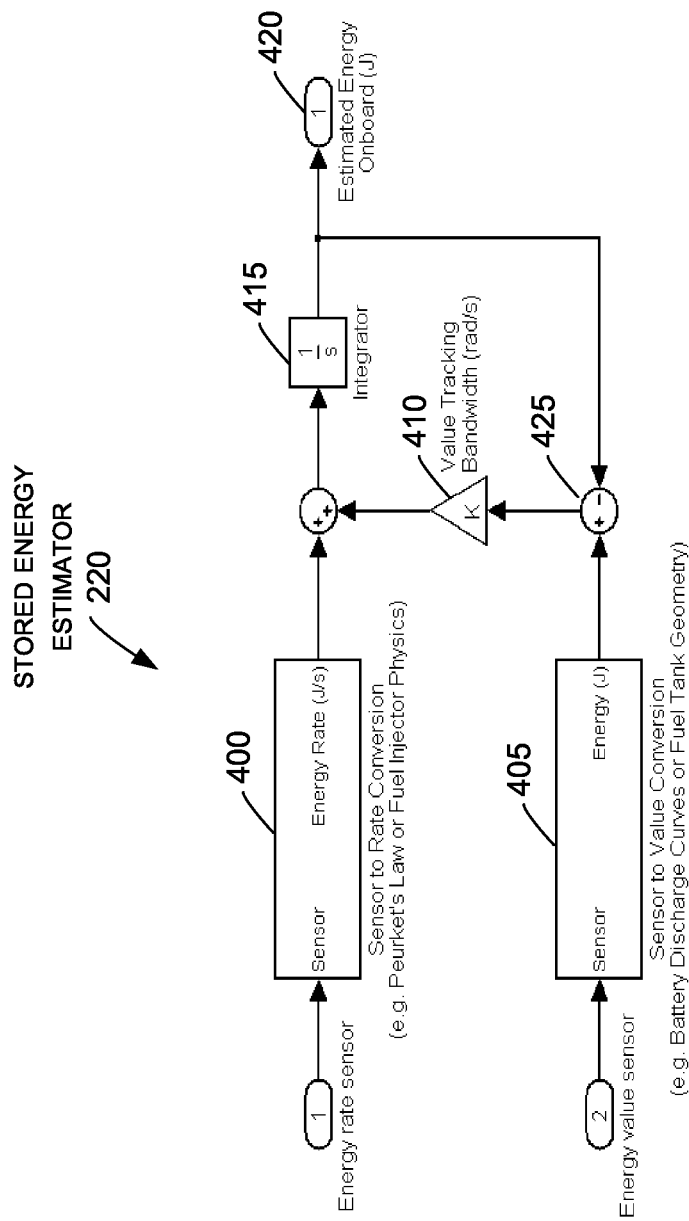
FIG. 4 illustrates a stored energy estimation routine performed by exemplary components of the vehicle controller, according to an embodiment of the disclosure.

FIG. 4 illustrates a stored energy estimation routine performed by exemplary components of the vehicle controller in FIG. 1, such as destination assurance engine 120. In some embodiments, the illustrated routines and actions can be performed by other components of vehicle controller 100, user devices 170A-N, motor controller 185, and/or sensors 165. Depending on the embodiment, the method of FIG. 4 may include fewer or additional blocks and blocks may be performed in an order that may be different than illustrated.

In the illustrated embodiment, stored energy estimator 220 may calculate an estimate of the onboard energy that is available for the vehicle. In an embodiment, because sensors 165 may not measure the energy and energy rate from the energy store directly, the illustrated conversion blocks 400 and 405 process the sensor information, such as energy rate and energy value before it is used. For example, because batteries lose more charge than a current measurement would indicate, especially at high discharge rates, the Columbic efficiency can be estimated with Peukert's Law as shown in block 400. In a fueled vehicle, fuel flow measurements often may not be present, but fuel injector open time and fuel pressure measurements can be combined to estimate the fuel flow rate in block 400.

Continuing to block 405, in battery applications a battery chemistry model and state of charge estimator may be used to track battery usage in real-time and serve as a total energy estimator. In the illustrated embodiment, for energy sensing in an electric application, battery voltage and current can be looked up in tables of battery discharge curves to estimate the state of charge and thus the energy remaining. In liquid fuel applications, a fuel level sensor can be combined with tank geometry information to estimate the fuel volume remaining.

Moving to blocks 410, 415, and 420 after the energy rate is calculated, the energy rate can be integrated to estimate the energy currently onboard. This energy estimate may then be compared to the energy calculated from the energy sensor (block 425), and the difference can be used to adjust the energy estimate at a rate based on the difference. If either of the illustrated sensors are not functioning, the sensor(s) readings can be disconnected from the integration process (not shown) so it does not corrupt the estimate. The stored energy estimator 220 can be displayed graphically by user application 175A-N in order to inform a user that they should not accelerate going downhill if the energy estimate is low, for example. Further, the user application 175A-N and/or motor controller 185, may disable the accelerator for the operator when going downhill if the energy estimate is low.

Figure 5:
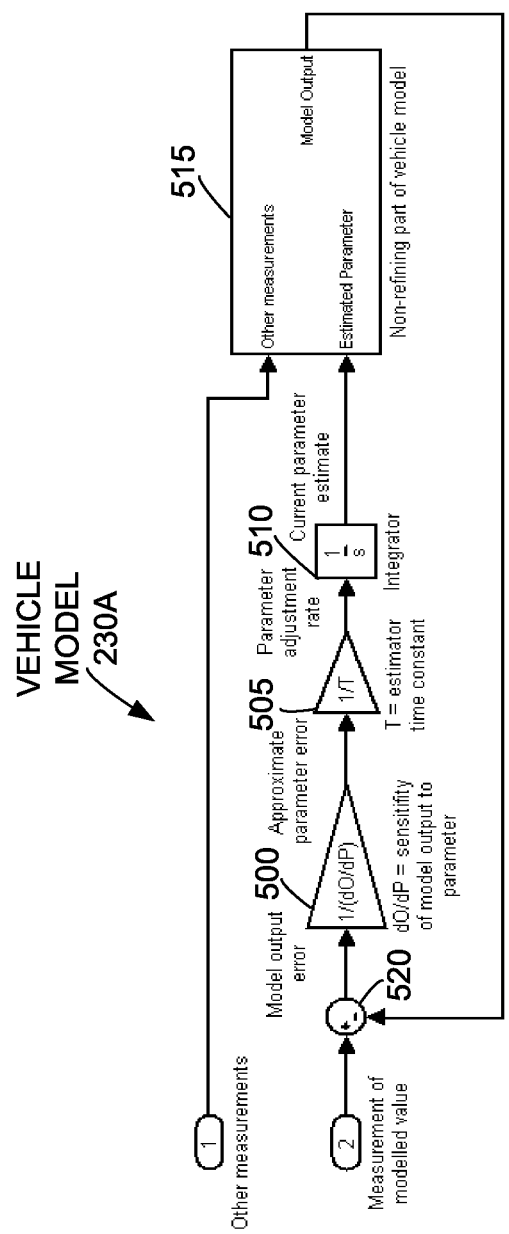
FIG. 5 illustrates a vehicle model routine performed by exemplary components of the vehicle controller, according to an embodiment of the disclosure.

FIG. 5 illustrates a general model adaptation function of the vehicle model routine performed by exemplary components of the vehicle controller in FIG. 1, such as destination assurance engine 120. In some embodiments, the illustrated routines and actions can be performed by other components of vehicle controller 100, user devices 170A-N, motor controller 185, and/or sensors 165. Depending on the embodiment, the method of FIG. 5 may include fewer or additional blocks and blocks may be performed in an order that may be different than illustrated.

In the illustrated embodiment, vehicle model 230A may in blocks 515 and 520 compute the difference between a model output, such as power required or cell voltage, and the actual sensed value of that variable, as well. Continuing to block 500, this difference is the error in the modeled output and may be used to refine parameter estimates. Vehicle model 230A may then divide this difference by the sensitivity of the model output to the parameter being estimated, in other words, the partial derivative of the model output with respect to the parameter. The quotient is the estimated parameter error.

Moving to blocks 505 and 510, this parameter error can be divided by a filter time constant and integrated to update the current parameter estimate. In this way, the larger the parameter error, the faster the parameter estimate is adjusted. When the model output matches the actual sensed value over the periods on the order of the filter time constant, the input to the integrator is zero, and the parameter estimate stops changing in blocks 515 and 520.

Figure 6:
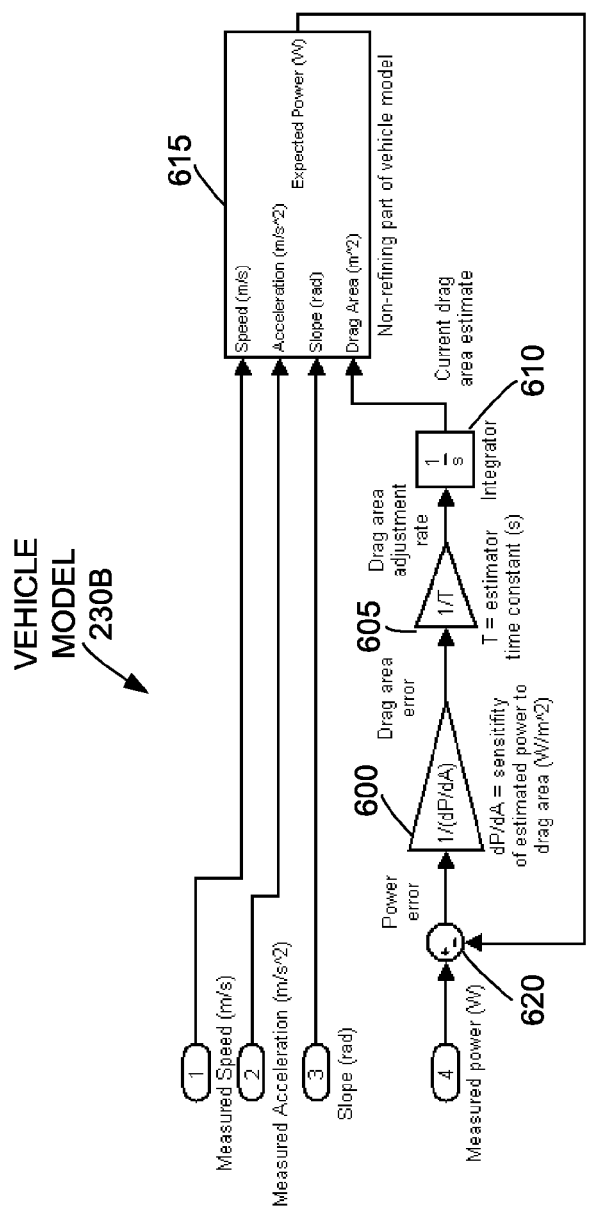
FIG. 6 illustrates another vehicle model routine performed by exemplary components of the vehicle controller, according to an embodiment of the disclosure.

FIG. 6 illustrates a specific vehicle model adaptation routine performed by exemplary components of the vehicle controller in FIG. 1, such as destination assurance engine 120. In some embodiments, the illustrated routines and actions can be performed by other components of vehicle controller 100, user devices 170A-N, motor controller 185, and/or sensors 165. Depending on the embodiment, the method of FIG. 6 may include fewer or additional blocks and blocks may be performed in an order that may be different than illustrated.

In the illustrated embodiment, vehicle model 230B may in blocks 600, 605 and 610 estimate drag area. As shown, the inputs used by vehicle model 230B to predict vehicle power may be speed, acceleration, and/or slope. When these inputs are combined with the current drag area estimate, the non-refining part of the model can predict the expected vehicle power as shown in block 615. In blocks 620, the expected vehicle power may be compared with the measured vehicle power, and the error can be used to adjust the current estimate of drag area held by the integrator, as described above.

A person of skill in the art will appreciate that there are many other well-known estimation methods that could be used to refine model parameters en route, and thus improve destination assurance, such as an Extended Kalman filter, particle filter, complementary filters, second order filters, and/or a model bank. As the values of parameters in the vehicle model are updated based on differences between expectations and measurements, vehicle health conditions that may warrant notifying the vehicle operator or other vehicle systems may be detected. For example, high rolling resistance can indicate a flat tire. Of note, a rapid reset may be used to reset the filter in applications where new tires are fitted to the vehicle or a flat tire is detected. In some applications, model parameters may even be displayed by user application 175A-N of user device 170A-N. For example in motorcycle racing, displaying drag area can help riders position their bodies optimally.

Figure 7:
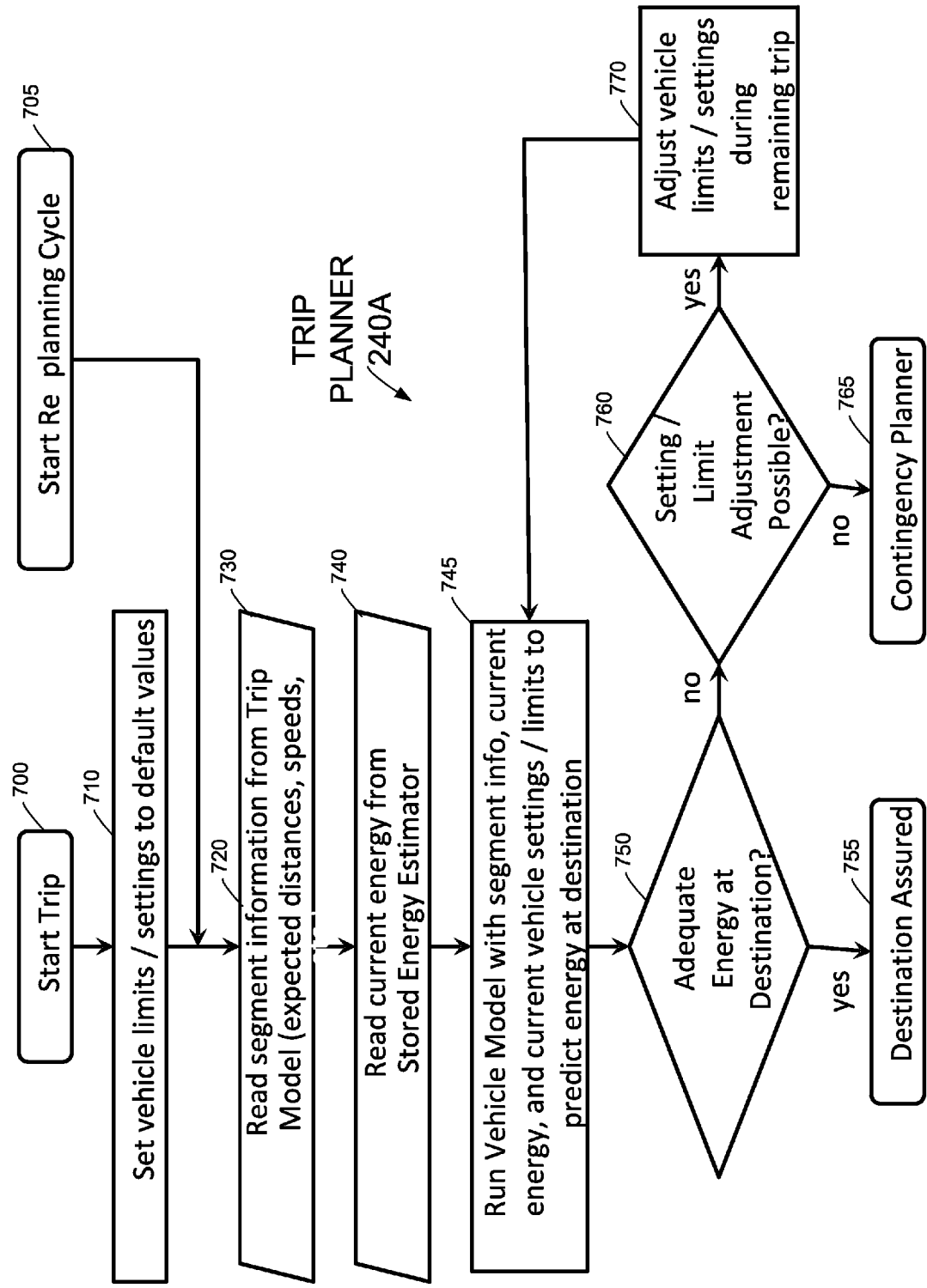
FIG. 7 illustrates a flow diagram of trip planning performed by exemplary components of the vehicle controller, according to an embodiment of the disclosure.

FIG. 7 illustrates a flow diagram of trip planning performed by exemplary components of the vehicle controller in FIG. 1, such as destination assurance engine 120. In some embodiments, the illustrated routines and actions can be performed by other components of vehicle controller 100, user devices 170A-N, motor controller 185, and/or sensors 165. Depending on the embodiment, the method of FIG. 7 may include fewer or additional blocks and blocks may be performed in an order that may be different than illustrated.

As shown, trip planner 240A (sometimes referred to herein as "finishing algorithm") can maintain a trip plan of vehicle limits and settings for the upcoming segments of a trip that ensure the trip can be completed with the remaining energy onboard and/or generate the plan using a physics model of the vehicle, along with information from a trip model, such as segment distances and expected speeds, and an estimate of the energy remaining onboard. As illustrated, in blocks 700, 710, 720, 730, and 740 the vehicle limits and settings, segmentation information from the trip model, and a stored energy estimate may be obtained. Moving to block 745 the vehicle model is executed based on the foregoing data in order to predict the energy that will remain when the destination is reached.

Continuing to blocks 750, 755, 760 if it is predicted that there is adequate energy to reach the destination the trip planner 240A routine may be ended. Alternatively, if the prediction is that there will not be enough energy to reach the destination, various settings or limits of the vehicle may be adjusted to reduce energy consumption (blocks 760 and 770), for example. Some of the limits and settings adjusted may include: maximum motor or battery torque (e.g., this may be equivalent to maximum current or power), maximum vehicle speed, amount of regeneration current allowed (e.g., more current can be allowed for a few trips).

Of note, there are many methods the trip planner 240A can use to adjust these settings to reduce energy consumption and assure the vehicle reaches its destination. The most sophisticated method may be to run an optimizer each cycle, such as a constrained gradient descent optimizer or a genetic algorithm. The constraints for the optimization algorithm may be that the vehicle has adequate energy at the destination and that the vehicle model equations are satisfied. The cost function may be a measure of operator satisfaction, such as time required to reach the destination. For example, the optimizer can select the vehicle settings and limits for each remaining trip segment to minimize the remaining travel time such that adequate energy will remain at the end of the trip and/or the vehicle model equations were satisfied. Other cost functions, can be selected by the vehicle operator in some implementations.

The optimization approach can also enable the trip planner 240A to give guidance to the operator beyond only ensuring he or she reaches the destination. In an aircraft application, for example, the cost function could be set to minimize trip cost or a combination of fuel use and crew time. The optimizer of trip planner 240A can then present flight speed suggestions that not only guarantee completing the flight, but within that constraint, minimize trip cost.

Trip planner 240A may use simpler adjustment methods than full optimization. For example, a classical control law, such as a proportional-integral-derivative (PID) control law, can be used to adjust a single offset that may be added to all power limits for the rest of the trip. The control law input can be the difference between a pre-calculated energy target for this point in the trip and the actual energy remaining according to the stored energy estimator described herein, as will be described with FIG. 8 below. Moving to block 765, if setting or adjustment vehicle limits is insufficient to provide destination assurance, a contingency planner may be executed.

Figure 8:
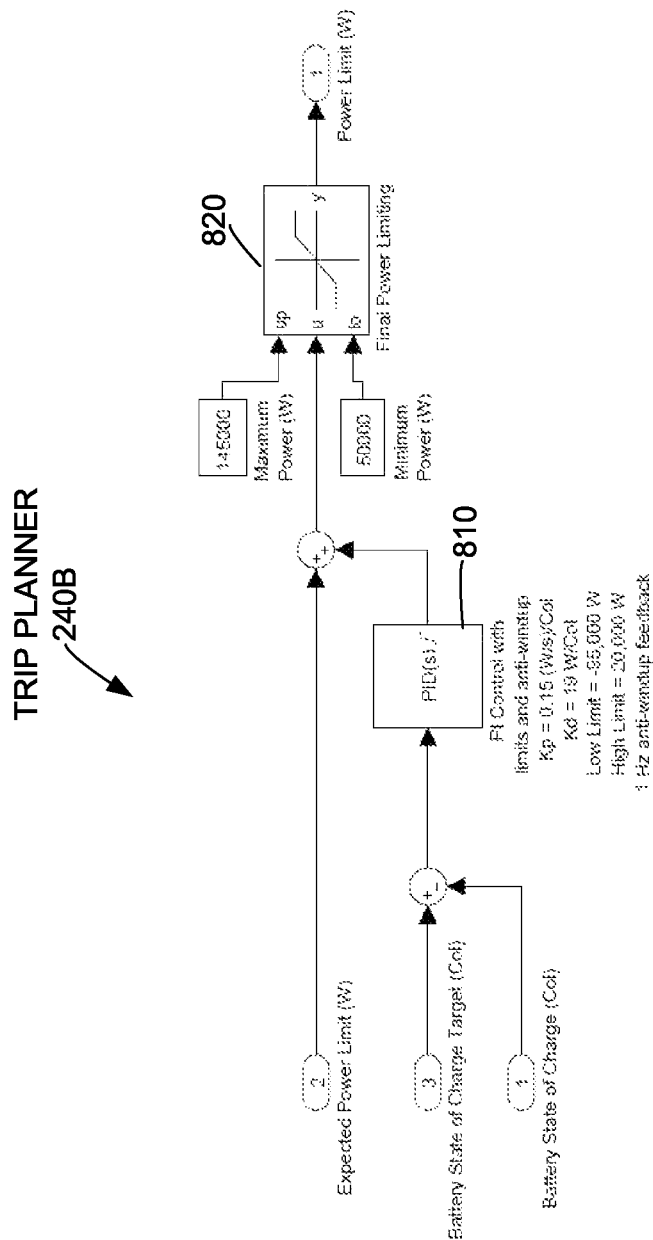
FIG. 8 illustrates another trip planner routine performed by exemplary components of the vehicle controller, according to an embodiment of the disclosure.

FIG. 8 illustrates another trip planner routine performed by exemplary components of the vehicle controller in FIG. 1, such as destination assurance engine 120. In some embodiments, the illustrated routines and actions can be performed by other components of vehicle controller 100, user devices 170A-N, motor controller 185, and/or sensors 165. Depending on the embodiment, the method of FIG. 8 may include fewer or additional blocks and blocks may be performed in an order that may be different than illustrated.

In the illustrated embodiment, trip planner 240B (sometimes referred to herein as "finishing algorithm") may in blocks 810 and 820 adjust the power limit of the vehicle up or down depending on the degree to which vehicle is deviating from the trip plan. As shown, the inputs used by trip planner 240B to adjust the vehicle power may be the expected power limit, the targeted or ideal battery state of charge, and the actual state of charge of the battery. Based on a comparison of a the actual and preferred battery charge states at a particular point in the trip, the trip planner 240B controls or limits the power used by the vehicle. For example, the maximum motor torque (e.g., this may be equivalent to maximum current or power), maximum vehicle speed, may be adjusted upwards if the actual charge exceeds the expected charge or adjusted downwards if the actual charge is below the expected charge. Alternately, or in addition, the amount of regeneration current allowed could be adjusted upward if the actual charge was below the expected charge. A person of skill in the art will appreciate that the illustrated trip planner 240B can be readily applied to any fuel type, such as liquid fuel, compressed natural gas, etc.

Figure 9:
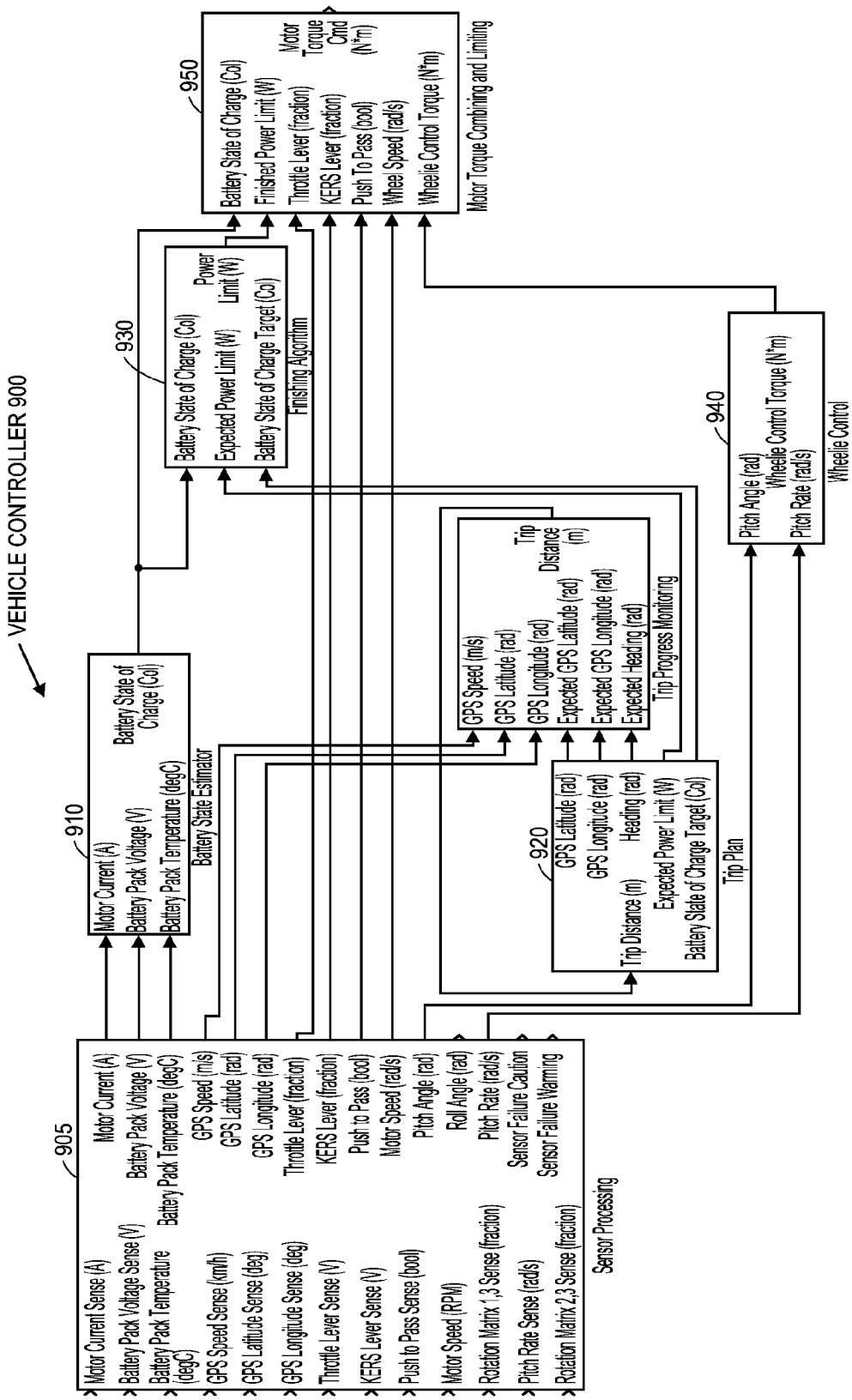
FIG. 9 illustrates another exemplary block diagram of the vehicle controller of FIG. 1, according to an embodiment of the disclosure.

FIG. 9 illustrates another exemplary block diagram of the vehicle controller of FIGS. 1 and 2. In some embodiments, the illustrated routines and actions can be performed by components of user devices 170A-N, motor controller 185, and/or sensors 165. Depending on the embodiment, the method of FIG. 9 may include fewer or additional blocks and blocks may be performed in an order that may be different than illustrated.

Beginning in the sensor processing block 905, vehicle controller 900 may receive and process the illustrated sensor inputs, such as GPS latitude, longitude, motor RPM, etc. and output the illustrated signals, such as motor current, battery pack voltage, etc. Moving to the battery state estimator block 910, based on the inputs received from the sensor processing block 905, vehicle controller 900 may estimate and output the state of battery charge based on the motor current, battery pack voltage, and battery pack temperature. Continuing to the trip plan block 920, vehicle controller 900 may calculate the GPS latitude, GPS longitude, heading, expected power limit, and battery state of charge target based, in part, on a calculation of the trip distance that remains from the trip progress monitoring block (sometimes referred to herein as trip model 210, see FIG. 3 and accompanying description).

Moving now to the finishing algorithm block 930 (see FIGS. 7-8 and accompanying description), vehicle controller 930 may compute the actual power limit based on the battery state of charge, expected power limit, and battery state of charge target. Based on the power limit, the motor torque combining and limiting block may output a motor torque command that adjusts the torque of the motor up or down based on the state of the on-board power systems. Thus, vehicle controller 900 can allow the vehicle to complete a given drive at a given speed based on an inputted destination or planned route from the operator, as well as determine what speed and drive torque the route can be driven at based on the current battery State of Charge (SOC). As shown, in blocks 920, 930 and 950, vehicle controller 900 accounts for the vehicle energy usage and route specifics (elevation change, road type, number of stoplights, traffic, weather, etc.) in determining energy usage along the route, calculates the maximum torque and speed at which the route can be traveled, and/or outputs a corresponding motor torque command.

Continuing now to the wheelie control block 940, this block may be utilized in high-performance vehicle applications, such as for motorcycles, where there may be substantial torque and/or the vehicle is wheelie prone, making maximal acceleration difficult to control. In such applications, if the vehicle operator intends to wheelie, it is extremely difficult to control the height of the wheelie, and thus execute a wheelie safely. Wheelie control block 940 provides a sensing and control system that can allow the vehicle operator to set the maximum wheelie angle (including zero wheelie angle), and to easily control the wheelie/pitch angle (e.g., radians) and the pitch angle rate (e.g., radians per second). This advantageously allows the vehicle operator to safely achieve maximal acceleration, and if desired, hold a desired wheelie angle. Wheelie control block 940 can use a sensor that reads weight on the front wheel and inertial sensors that reads vehicle altitude. Alternatively, vehicle control block 940 may use only a front wheel sensor that allows maximal acceleration without lifting the front wheel, while it may not allow the rider to hold a non-zero wheelie angle.

The wheelie control block 940 may be used in conventional or electric motorcycle vehicles, scooters, and the like. It may be even more well-suited to electric motorcycles, because their electric motors can deliver substantially more torque than conventional engines at a low speed; thus, there is an even greater need for wheelie control capabilities in such applications. The wheelie control block can also take advantage of the instant torque control available in an electric propulsion system to control wheelies, and thus maximum acceleration, using even higher performance techniques than are possible on a conventional motorcycle. User application 175A-N may provide a GUI that provides an interface which allows the operator to input a maximum vehicle pitch angle and rate, and in response to the input, vehicle controller 900 may execute wheelie control block 940.

Moving to motor torque combining and limiting block 950, one or more of the following various parameters may be received as inputs: battery state of charge, finishing power, throttle lever state or position, KERS lever state or position, push to pass, wheel speed, and/or the wheel control torque. Based on the received inputs, motor torque combining and limiting block 950 calculates a control or power limit signal, such as motor torque command that may be sent to motor controller 185 of FIG. 1. The outputted controls signal adjusts the torque of the motor up or down based on the state of the on-board power or energy storage systems.

Depending on the application, motor torque combining and limiting block 950 may limit the vehicle speed in addition to drive torque in order to achieve the desired vehicle range. Of note, the vehicle operator may override these limits to account for unexpected torque/speed requirements, and the vehicle controller 900 can recalculate limits as the route is traveled. Vehicle controller 900 may also utilize different torque/speed limits for different types of driving. For example, the highway portion of a route would need different limits than would a residential portion.

Figure 10:
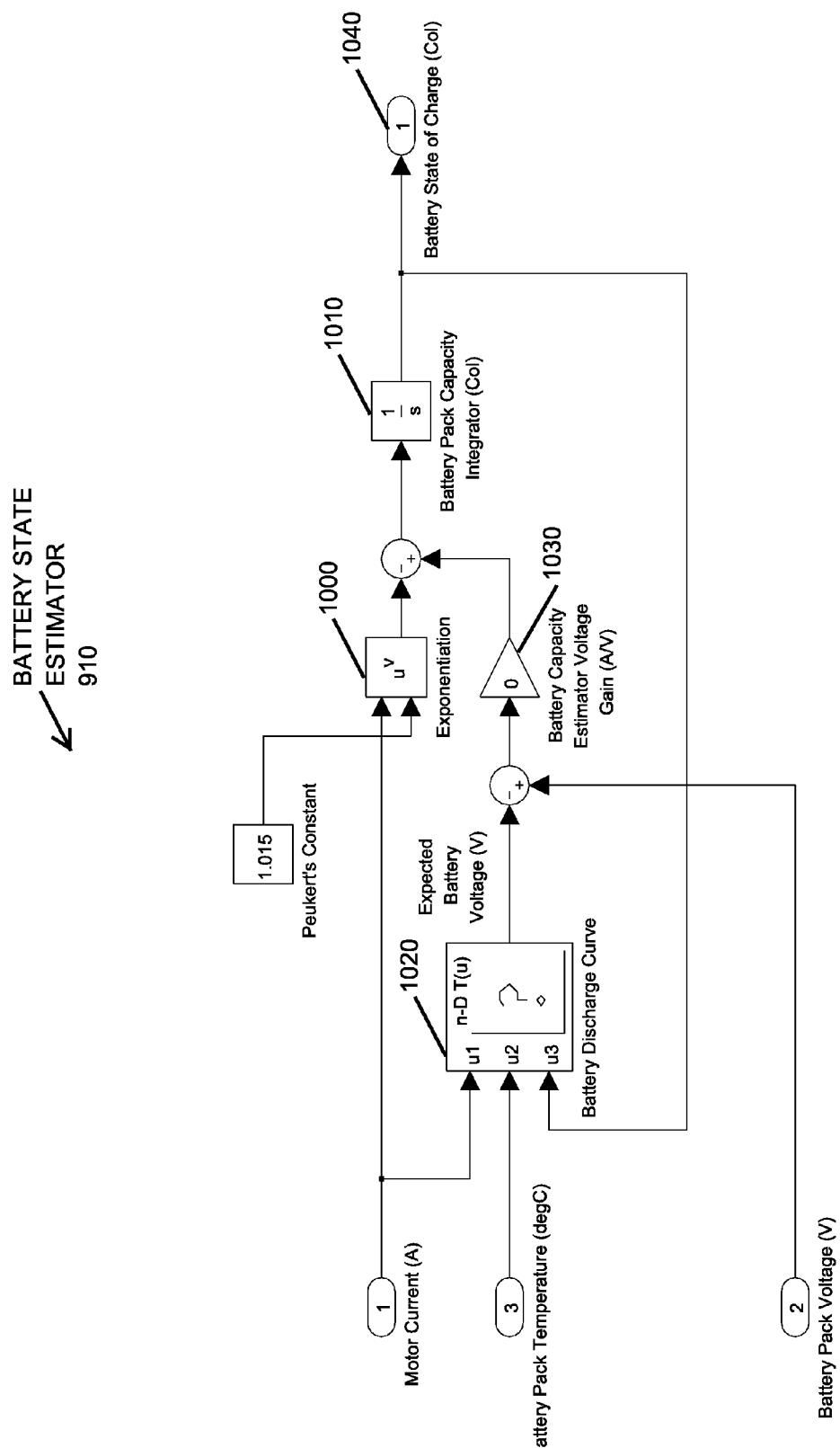
FIG. 10 illustrates a battery estimation routine performed by exemplary components of the vehicle controller of FIG. 9, according to an embodiment of the disclosure.

FIG. 10 illustrates a battery estimation routine 910 performed by exemplary components of the vehicle controller of FIG. 9. In some embodiments, the illustrated routines and actions can be performed by components of vehicle controller 100, user devices 170A-N, motor controller 185, and/or sensors 165 of FIG. 1. Depending on the embodiment, the method of FIG. 10 may include fewer or additional blocks and blocks may be performed in an order that may be different than illustrated.

Based on inputs of battery current(s), temperature(s), and/or voltage(s), the battery state of charge is determined. A battery chemical, electrical, thermal, and/or empirical model can be used to determine the expected battery state of charge based on the history of measurements. For example, a thermo-chemical model with anode, cathode, and electrolyte ion concentration distributions, as well as temperature distributions, can be used. FIG. 10 shows a simpler exemplary embodiment of an empirical model. It integrates current accounting for Peukert's Law (block 1000) to estimate state of charge, and corrects this estimate based on differences between expected and measured battery voltage (block 1030). The estimated voltage is computed using current, temperature, and estimated state of charge (block 1020).

In other embodiments, for vehicles where volume, cost, or weight requirements prohibit the installation of a battery management system onboard, or where only basic battery monitoring is provided onboard, battery estimation routine 910 may further comprise an external battery management system—battery health monitor engine (not shown)—that may be connected via one or more connectors having wires going to each battery cell terminal in the battery, for example.

The Battery health monitor engine measures the real-time cell current and voltage and estimates the impedance of the cells of a battery. A battery chemistry model and test data may be utilized that includes data from a subset of normal operating regions and determine impedance based on cell current and voltage are linearly correlated with battery impedance to determine. Based on inputs of cell-by-cell voltage and current monitoring, battery health monitor engine may track impedance changes in real-time; thus allowing the individual cell health of the battery pack can be tracked and damaged cells can be identified for replacement by vehicle operator. Thus, battery health monitor engine may also inform vehicle information systems on required maintenance or imminent cell failures. This information may also be fed into the destination assurance engine to provide accurate pack energy estimates and estimate battery resistive energy losses.

Battery health monitor engine enables cell-by-cell state of health measurement and precise cell balancing during charge. The battery health monitor engine can include resistive loads to test cell behavior under load and/or to identify cells with excessive impedance buildup. The battery health monitor engine can also track cell-by-cell state of health across charge cycles to identify and alert the user to any trends indicative of imminent cell failure or end of life. The vehicle controller can thus communicate with an onboard state of health monitor and feed impedance data to an onboard battery state estimator used for destination assurance algorithms or performance estimates.

Figure 11:
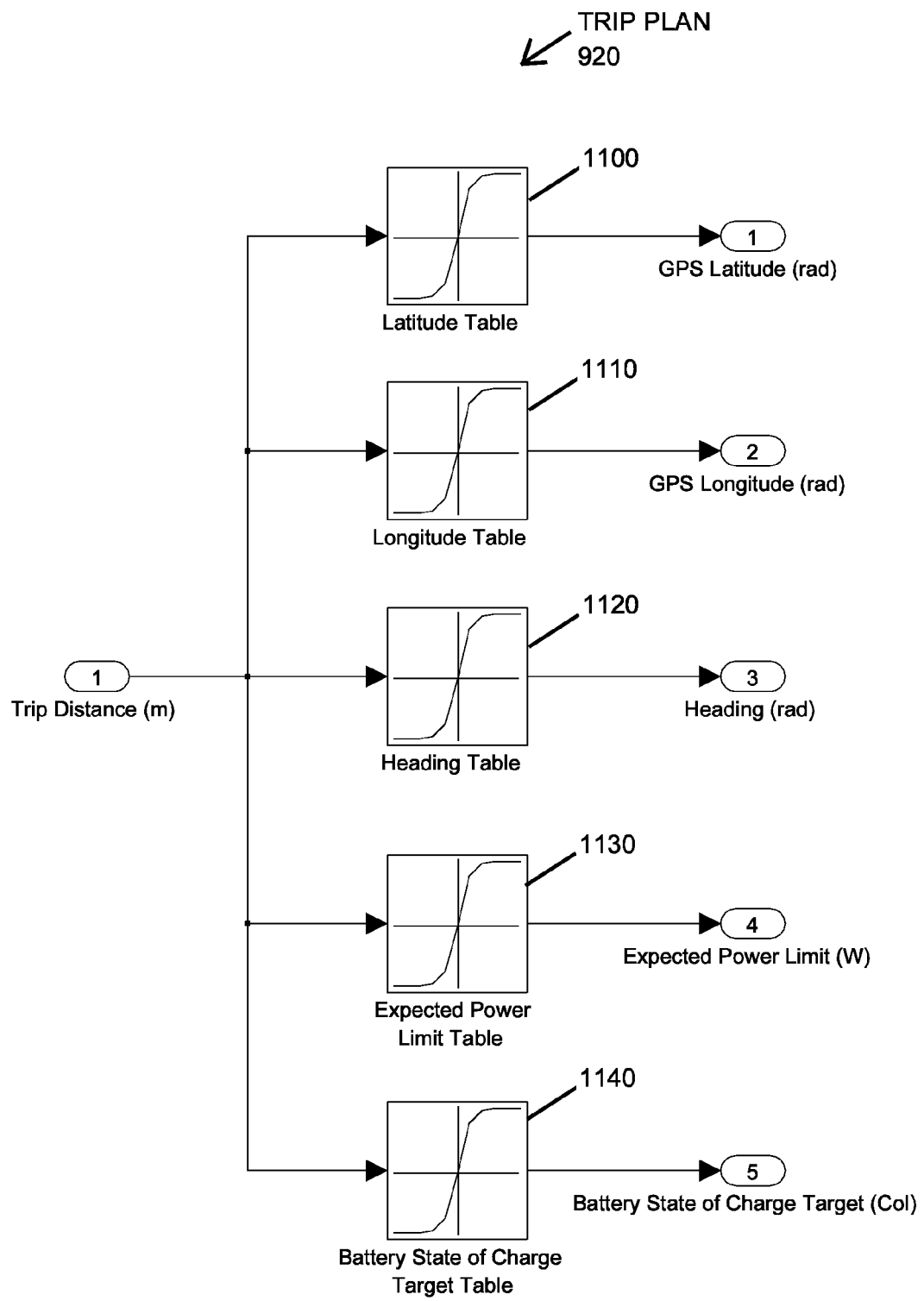
FIG. 11 illustrates a trip planner routine performed by exemplary components of the vehicle controller, according to an embodiment of the disclosure.

FIG. 11 illustrates an exemplary computation of trip segment information performed by exemplary components of the trip model in FIG. 2 and trip plan block in FIG. 9. In some embodiments, the illustrated routines and actions can be performed by components of vehicle controller 100, user devices 170A-N, motor controller 185, and/or sensors 165. Depending on the embodiment, the method of FIG. 11 may include fewer or additional blocks and blocks may be performed in an order that may be different than illustrated. As shown, a trip plan can be outputted by trip planner routine 920 that includes vehicle limits and settings, including the GPS latitude 1100, GPS longitude 1110, heading 1120, an expected power limit 1130 that may be used to control the motor, and/or the battery state of charge 1140. During each cycle of a trip, trip planner 920 may recalculate one or more of these parameters of the trip plan based on the trip distance that remains, as explained in further detail in connection with FIG. 7.

Figure 12:
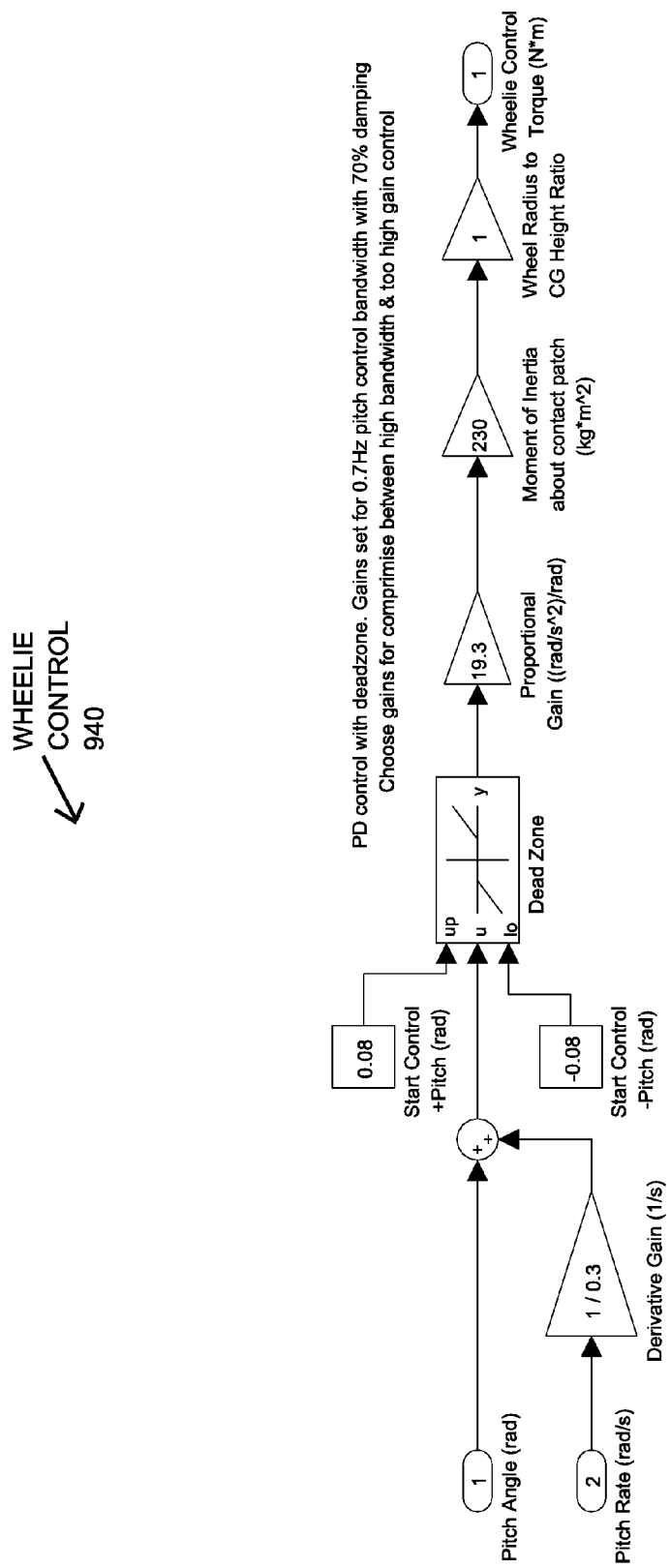
FIG. 12 illustrates a wheelie control routine performed by exemplary components of the vehicle controller, according to an embodiment of the disclosure.

FIG. 12 illustrates a wheelie control routine 940 performed by exemplary components of the vehicle controller of FIG. 9. In some embodiments, the illustrated routines and actions can be performed by components of vehicle controller 100, user devices 170A-N, motor controller 185, and/or sensors 165 of FIG. 1. Depending on the embodiment, the method of FIG. 12 may include fewer or additional blocks and blocks may be performed in an order that may be different than illustrated. As shown, wheelie control routine 940 receives a wheelie/pitch angle (e.g., radians) and the pitch angle rate (e.g., radians per second), and outputs an appropriate motor torque command that allows a vehicle operator to safely achieve maximal acceleration, and hold the desired wheelie angle.

Figure 13:
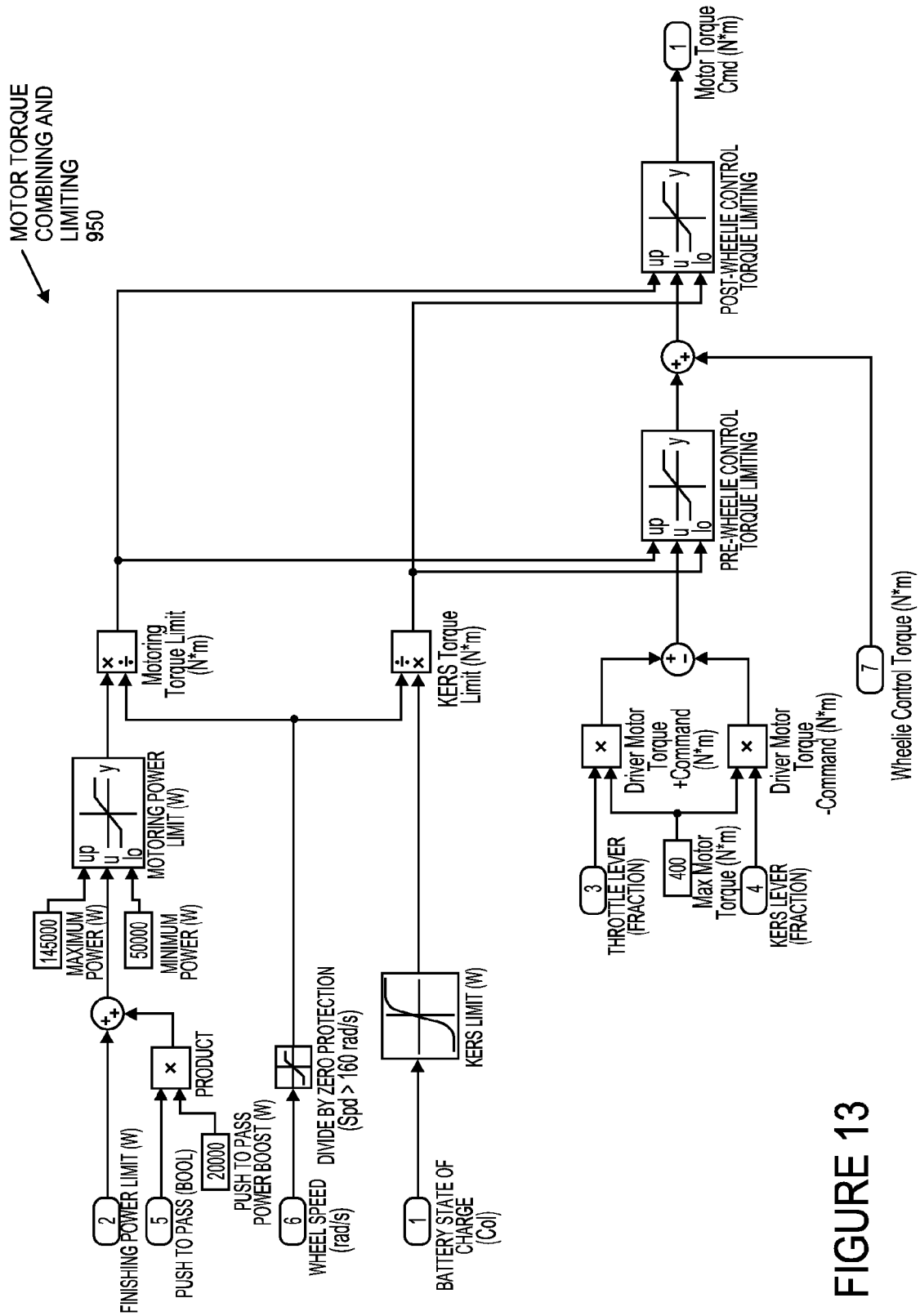
FIG. 13 illustrates a motor torque combining and limiting routine performed by exemplary components of the vehicle controller, according to an embodiment of the disclosure.

FIG. 13 illustrates a motor torque combining and limiting routine 950 performed by exemplary components of the vehicle controller of FIG. 9. In some embodiments, the illustrated routines and actions can be performed by components of vehicle controller 100, user devices 170A-N, motor controller 185, and/or sensors 165 of FIG. 1. Depending on the embodiment, the method of FIG. 13 may include fewer or additional blocks and blocks may be performed in an order that may be different than illustrated. As shown, motor torque combining and limiting routine 950 can receive the following parameters: battery state of charge, finishing power limit, throttle lever position, KERS lever position, push to pass input from a vehicle operator, wheel speed, and the wheel control torque. Based on one or more of these inputs, an appropriate motor torque command is issued that provides destination assurance and/or a desired wheelie angle to be held.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for ensuring a vehicle reaches its intended destination, comprising the steps of:
   a) receiving information to determine a starting position for the vehicle;
   b) receiving information relating to an intended destination for the vehicle;
   c) computing at least one route between the starting position and the intended destination considering at least one of:
      (i) topographical features along said route;
      (ii) actual, predicted, or historical traffic along said route;
      (iii) actual, predicted, or historical weather along said route;
      (iv) distance;
      (v) driving speed;
   d) iteratively estimating energy available to the vehicle during a trip, wherein the step of iteratively estimating the energy available to the vehicle includes:
      (i) receiving an input from a rate sensor and an input from a value sensor;
      (ii) integrating the rate sensor input to determine an integrated energy estimate;
      (iii) comparing the integrated energy estimate to the value sensor input to determine a difference;
      (iv) calculating the energy available by adjusting the value sensor input at a rate corresponding to the difference resulting from the comparison; and
      (v) repeating steps (i) to (iv) during the course of the trip;
   e) determining whether the energy available to the vehicle is sufficient to propel the vehicle from the starting position to the intended destination based on the at least one computed route; and
   f) generating a signal based on the results obtained in step (e).

2. The method of claim 1, wherein in an electric application, the rate sensor input includes battery current.

3. The method of claim 2, wherein in an electric application, the value sensor input includes battery voltage.

4. The method of claim 1, wherein in a liquid fuel application, the rate sensor input includes fuel injector open time or fuel injector pressure differential.

5. The method of claim 4, wherein in a liquid fuel application, the value sensor input includes tank level.

6. A system for ensuring a vehicle reaches its intended destination comprising:
- at least one user device having at least one user application; and
- a vehicle controller having a destination assurance engine, the destination assurance engine including a stored energy estimator configured to iteratively estimate energy available to the vehicle during a trip by:
  - (i) receiving an input from a rate sensor and an input from a value sensor;
  - (ii) integrating the rate sensor input to determine an integrated energy estimate;
  - (iii) comparing the integrated energy estimate to the value sensor input to determine a difference;
  - (iv) calculating the energy available by adjusting the value sensor input at a rate corresponding to the difference resulting from the comparison; and
  - (v) repeating steps (i) to (iv) during the course of the trip.

7. The system of claim 6, wherein in an electric application, the rate sensor input includes battery current.

8. The system of claim 7, wherein in an electric application, the value sensor input includes battery voltage.

9. The system of claim 6, wherein in a liquid fuel application, the rate sensor input includes fuel injector open time or fuel injector pressure differential.

10. The system of claim 9, wherein in a liquid fuel application, the value sensor input includes tank level.

* * * * *